US012724148B2

(12) United States Patent
Nakamura et al.

(10) Patent No.: US 12,724,148 B2
(45) Date of Patent: Sep. 1, 2026

(54) DUAL OPTICAL FREQUENCY COMB GENERATOR AND MEASUREMENT APPARATUS

(71) Applicant: Panasonic Intellectual Property Management Co., Ltd., Osaka (JP)

(72) Inventors: Tasuku Nakamura, Osaka (JP); Yasuhisa Inada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 933 days.

(21) Appl. No.: 18/058,911

(22) Filed: Nov. 28, 2022

(65) Prior Publication Data

US 2023/0087964 A1 Mar. 23, 2023

Related U.S. Application Data

(63) Continuation of application No. PCT/JP2021/021700, filed on Jun. 8, 2021.

(30) Foreign Application Priority Data

Jun. 26, 2020 (JP) ................................ 2020-110236

(51) Int. Cl.

*G01S 17/08* (2006.01)
*G01N 21/31* (2006.01)
*G01S 7/481* (2006.01)

(52) U.S. Cl.

CPC .............. *G01S 17/08* (2013.01); *G01N 21/31* (2013.01); *G01S 7/4815* (2013.01); *G01N 2201/06113* (2013.01); *G01N 2201/08* (2013.01)

(58) Field of Classification Search

CPC ........ G01S 17/08; G01S 7/4815; G01S 17/32; G01N 21/31; G01N 2201/06113;

(Continued)

(56) References Cited

U.S. PATENT DOCUMENTS 10,020,635 B1 * 7/2018 Lyakh ...................... G01J 3/28
2008/0018906 A1 * 1/2008 Kurokawa ......... G01B 11/2441 359/326

(Continued)

FOREIGN PATENT DOCUMENTS

JP 2010-531444 9/2010
JP 2014-517344 7/2014

(Continued)

OTHER PUBLICATIONS

Dutt, Avik, et al. "Dual-comb spectroscopy using on-chip mode-locked frequency combs." CLEO: Science and Innovations. Optica Publishing Group, 2017. (Year: 2017).*

(Continued)

*Primary Examiner* — Dominic J Bologna
(74) *Attorney, Agent, or Firm* — Rimon P.C.

(57) ABSTRACT

A dual optical frequency comb generator incudes a semiconductor substrate, a first optical frequency comb laser light source including a first resonator, a second optical frequency comb laser light source including a second resonator and differing in repetition frequency of optical pulses from the first optical frequency comb laser light source, two or more outputters including first and second outputters, a first optical waveguide connecting the first optical frequency comb laser light source with the first outputter, a second optical waveguide connecting the second optical frequency comb laser light source with the second outputter, and a third optical waveguide that branches off from the first optical waveguide and joins the second optical waveguide. The first optical frequency comb laser light source, the second optical frequency comb laser light source, the two or more outputters, and the optical waveguides are integrated on the semiconductor substrate.

10 Claims, 7 Drawing Sheets

(58) Field of Classification Search
CPC .............. G01N 2201/08; G02B 6/4215; G02F 2203/56; G02F 2/02; G02F 1/365; G02F 1/025; G01J 3/0218; G01J 3/10; G01J 3/453; H01S 3/005
See application file for complete search history.

(56) References Cited

U.S. PATENT DOCUMENTS

| | | | | |
|---|---|---|---|---|
| 2011/0043815 | A1 | 2/2011 | Giaccari et al. | |
| 2013/0286402 | A1* | 10/2013 | Giaccari | G01J 9/04<br>356/451 |
| 2014/0253915 | A1* | 9/2014 | Ataie | G01M 11/338<br>356/300 |
| 2015/0325978 | A1* | 11/2015 | Fertig | G01B 9/02008<br>372/32 |
| 2018/0095003 | A1* | 4/2018 | Vahala | G02B 6/12 |
| 2018/0351319 | A1* | 12/2018 | Koptyaev | H01S 5/005 |
| 2019/0278151 | A1* | 9/2019 | Kwon | H01S 5/0085 |

FOREIGN PATENT DOCUMENTS

| | | |
|---|---|---|
| JP | 2014-160136 | 9/2014 |
| JP | 2020-012641 | 1/2020 |
| WO | 2012/158727 | 11/2012 |
| WO | 2019/123719 | 6/2019 |

OTHER PUBLICATIONS

International Search Report of PCT application No. PCT/JP2021/021700 dated Aug. 17, 2021.

Nathalie Picque et al., “Frequency comb spectroscopy”, Nature Photonics, Mar. 2019, vol. 13, 2019, pp. 146-157.

Ian Coddington et al., “Dual-comb spectroscopy”, Optica, Apr. 2016, vol. 3, No. 4, 2016, pp. 414-426.

Alexander L. Gaeta et al., “Photonic-chip-based frequency combs”, Nature Photonics, Mar. 2019, vol. 13, 2019, pp. 158-169.

S. Keyvaninia et al., “Narrow-linewidth short-pulse III-V-on-silicon mode-locked lasers based on a linear and ring cavity geometry”, Optics Express, 2015, vol. 23, Issue 3, 2015, pp. 3221-3229.

* cited by examiner

Figure 10:
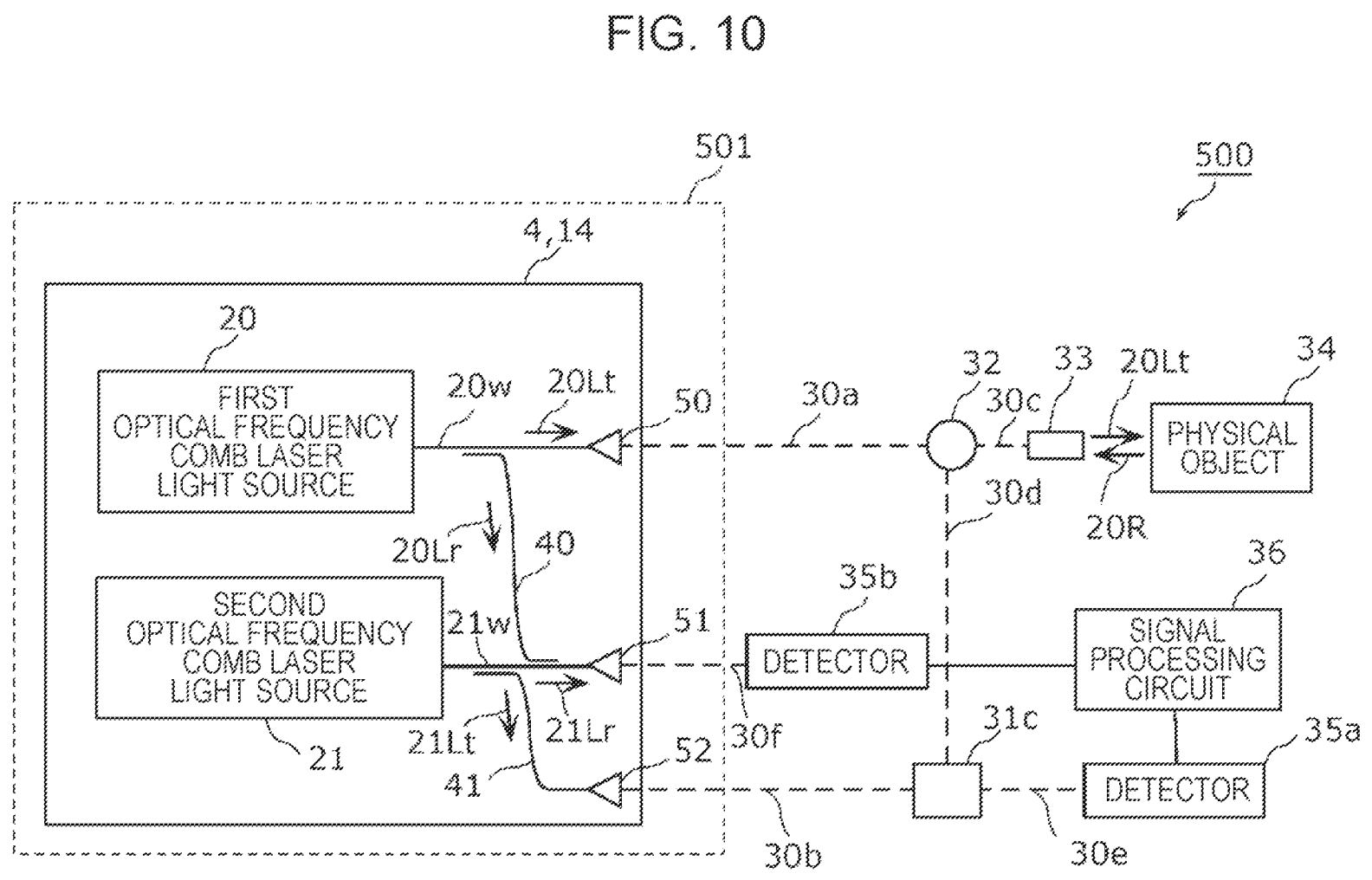

PHYSICAL OBJECT

SIGNAL PROCESSING CIRCUIT

DETECTOR

DETECTOR

FIRST OPTICAL FREQUENCY COMB LASER LIGHT SOURCE

SECOND OPTICAL FREQUENCY COMB LASER LIGHT SOURCE 34 36 35a 35b 20Lt 20R 33 32 30c 30d 31c 30e 30a 30b 30f 501 4, 14 50 51 52 20Lt 40 21Lr 20w 21w 20Lr 21Lt 41 20 21

DUAL OPTICAL FREQUENCY COMB GENERATOR AND MEASUREMENT APPARATUS

BACKGROUND

1. Technical Field

The present disclosure relates to a dual optical frequency comb generator and a measurement apparatus.

2. Description of the Related Art

The characteristics regarding the optical frequency of a physical object can be examined by illuminating the physical object with light and obtaining the frequency spectrum of light transmitted through the physical object or light reflected by the physical object. Conventionally, frequency spectra of light at high frequencies have been obtained by dispersing light through the use of a light source that fluctuates in intensity and a diffraction grating, a prism, or other devices. Therefore, the frequency spectra thus obtained have been limited in accuracy.

However, an optical frequency comb technology has made it possible to obtain frequency spectra of light with precision. The term "optical frequency comb" means a comb-shaped frequency spectrum formed from a plurality of discrete, equally spaced longitudinal modes. Laser light having an optical frequency comb is herein referred to as "optical frequency comb laser light".

Recently, dual-comb spectroscopy, which involves the use of two beams of optical frequency comb laser light that are slightly different in spacing (repetition frequency) between longitudinal modes of optical frequency combs from each other, has made it possible to more easily obtain frequency spectra of light (see, for example, N. Picque et al., "Frequency comb spectroscopy", Nature Photonics, 2019, Vol. 13, pp. 146-157, I. Coddington et al., "Dual-comb spectroscopy", Optica, 2016, Vol. 3, No. 4, pp. 414-426, and A. L. Gaeta et al., "Photonic-chip-based frequency combs", Nature Photonics, 2019, Vol. 13, pp. 158-169). Dual-comb spectroscopy makes it possible to examine the characteristics regarding the optical frequency of a physical object by illuminating the physical object with interfering light produced by superposition of these two beams of optical frequency comb laser light and obtaining the beat frequency spectrum of the interfering light transmitted through the physical object or the interfering light reflected by the physical object.

SUMMARY

Conventional dual-comb spectroscopy involves the use of various optical elements in addition to two optical frequency combs of different repetition frequencies. This results in an optical system that is complex and large in size as a whole. Recently, the overall size has been comparatively made smaller by the development of optical frequency combs integrated on a substrate (see S. Keyvaninia et al., "Narrow-linewidth short-pulse III-V-on-silicon mode-locked lasers based on a linear and ring cavity geometry", Optics Express, 2015, Vol. 23, Issue 3, pp. 3221-3229). However, the system is as complex as ever, and is expected to be made even smaller in size.

Further, optical frequency combs are undesirably vulnerable to external perturbations such as vibrations. Further, optical frequency combs are expected to be applied for various purposes other than the purpose of obtaining frequency spectra. For this reason, optical frequency combs are expected to offer high versatility.

One non-limiting and exemplary embodiment provides a dual optical frequency comb generator and a measurement apparatus that are small in size, have resistance to external perturbations, and offer high versatility.

In one general aspect, the techniques disclosed here feature a dual optical frequency comb generator including a semiconductor substrate, a first optical frequency comb laser light source including a first resonator, a second optical frequency comb laser light source including a second resonator and differing in repetition frequency of optical pulses from the first optical frequency comb laser light source, two or more outputters including a first outputter and a second outputter, a first optical waveguide connecting the first optical frequency comb laser light source with the first outputter, a second optical waveguide connecting the second optical frequency comb laser light source with the second outputter, and a third optical waveguide that branches off from the first optical waveguide and joins the second optical waveguide. The first optical frequency comb laser light source, the second optical frequency comb laser light source, the two or more outputters, the first optical waveguide, the second optical waveguide, and the third optical waveguide are integrated on the semiconductor substrate.

In one general aspect, the techniques disclosed here feature a measurement apparatus including the dual optical frequency comb generator, a first optical fiber having a first end connected to the first outputter, a second optical fiber having a first end connected to the second outputter, a circulator connected to a second end of the first optical fiber, third and fourth optical fibers each having a first end connected to the circulator, a collimator connected to a second end of the third optical fiber, a coupler that couples and outputs beams of light propagated separately through each of the third and fourth optical fibers, and a detector that detects light outputted from the coupler.

The present disclosure makes it possible to provide, for example, a dual optical frequency comb generator that is small in size, has resistance to external perturbations, and offers high versatility.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a diagram schematically showing a configuration of a dual optical frequency comb generator and a measurement apparatus according to Embodiment 2.

DETAILED DESCRIPTIONS

Brief Overview of the Present Disclosure

Figure 1A:
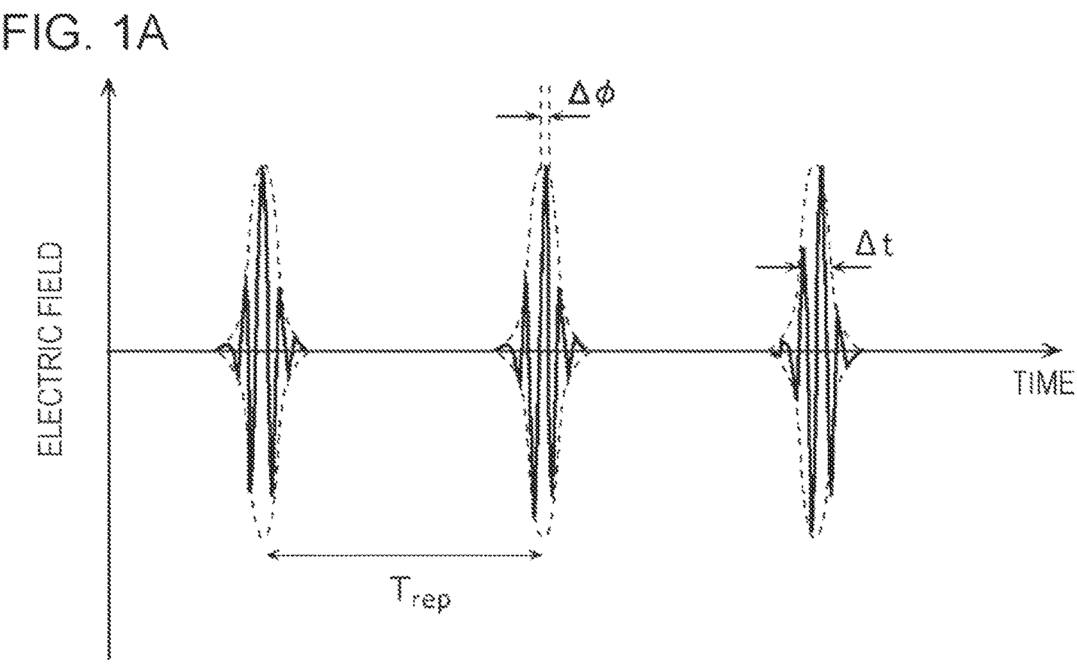
FIG. 1A is a diagram schematically showing changes in electric field of optical frequency comb laser light over time.

A dual optical frequency comb generator according to an aspect of the present disclosure incudes a semiconductor substrate, a first optical frequency comb laser light source including a first resonator, a second optical frequency comb laser light source including a second resonator and differing in repetition frequency of optical pulses from the first optical frequency comb laser light source, two or more outputters including a first outputter and a second outputter, a first optical waveguide connecting the first optical frequency comb laser light source with the first outputter, a second optical waveguide connecting the second optical frequency comb laser light source with the second outputter, and a third optical waveguide that branches off from the first optical waveguide and joins the second optical waveguide. The first optical frequency comb laser light source, the second optical frequency comb laser light source, the two or more outputters, the first optical waveguide, the second optical waveguide, and the third optical waveguide are integrated on the semiconductor substrate.

Thus, not only the optical frequency comb laser light sources but also the two or more outputters and the three optical waveguides are integrated on the semiconductor substrate. This integration makes it possible to achieve a small-sized, simplified dual-comb spectroscopic optical system. Further, the increase in the number of components integrated leads to increased resistance to external perturbations such as vibrations.

Meanwhile, in a case where all optical systems are integrated on the semiconductor substrate, the occurrence of errors in semiconductor processes of some elements makes it impossible to perform dual-comb spectroscopy. On the other hand, the present aspect makes it possible not only to reduce manufacturing errors by limiting the scope of integration to the outputters and optical systems at the stage preceding the outputters but also to freely rearrange optical systems at the stage subsequent to the outputters. This offers a wider range of options for applying the dual optical frequency comb generator, making it possible to enhance versatility. Thus, the present aspect makes it possible to provide a dual optical frequency comb generator that is small in size, has resistance to external perturbations, and offers high versatility.

Further, for example, in a plan view of the semiconductor substrate, the first outputter and the second outputter may be located on sides of the semiconductor substrate that are different from each other.

This makes it possible to keep the two outputters separated, thus making it possible to easily make physical connections of optical fibers separately to each of the two outputters.

Further, for example, the first resonator and the second resonator may each contain a gain medium located on an optical path.

This makes it unnecessary to provide a laser light source out of the optical path of a resonator, thus making it possible to achieve further reductions in size of the resonator.

Further, for example, the two or more outputters may each include an optical fiber coupler.

This makes it possible to cause optical frequency comb laser light outputted from the outputters to be inputted to the optical fibers.

Further, for example, the two or more outputters may include a third outputter, and the second optical waveguide may include a fourth optical waveguide that branches off from a path connecting the second optical frequency comb laser light source with the second outputter and joins the third outputter.

This makes it possible to separately detect signal light and reference light. Even in a case where there is an overlap in pulse between the signal light and the reference, the signal light and the reference signal can be separately detected. That is, a dead zone where an overlap in pulse between the signal light and the reference makes detection impossible can be eliminated.

Further, a measurement apparatus according to an aspect of the present disclosure includes the dual optical frequency comb generator, a first optical fiber having a first end connected to the first outputter, a second optical fiber having a first end connected to the second outputter, a circulator connected to a second end of the first optical fiber, third and fourth optical fibers each having a first end connected to the circulator, a collimator connected to a second end of the third optical fiber, a coupler that couples and outputs beams of light propagated separately through each of the third and fourth optical fibers, and a detector that detects light outputted from the coupler.

This makes it possible to achieve a measurement apparatus that, as is the case with the aforementioned dual optical frequency comb generator, is small in size, has resistance to external perturbations, and offers high versatility.

Further, for example, a measurement apparatus according to an aspect of the present disclosure may include the dual optical frequency comb generator, a first optical fiber having a first end connected to the first outputter, a second optical fiber having a first end connected to one of the second and third outputters, a circulator connected to a second end of the first optical fiber, third and fourth optical fibers each having a first end connected to the circulator, a collimator connected to a second end of the third optical fiber, a coupler that couples the third and fourth optical fibers, a coupler that couples and outputs beams of light propagated separately through each of the third and fourth optical fibers, and a detector. The detector may include a first detector that detects light outputted from the coupler and a second detector that detects light outputted from the other of the second and third outputters.

This makes it possible to separately detect signal light and reference light. Even in a case where there is an overlap in pulse between the signal light and the reference, the signal light and the reference signal can be separately detected. That is, a dead zone where an overlap in pulse between the signal light and the reference makes detection impossible can be eliminated.

Further, for example, the measurement apparatus according to an aspect of the present disclosure may further include a sweeping mechanism that sweeps light emitted from the collimator.

This makes it possible to change the position of illumination of a physical object with laser light, thus making it possible to obtain two-dimensional or three-dimensional information on the physical object.

Further, for example, the measurement apparatus according to an aspect of the present disclosure may further include a signal processing circuit that measures a distance to a physical object based on a result of detection by the detector.

This makes it possible to measure the color or other attributes of the physical object. For example, since gas or other substances in the air can be measured, the measurement apparatus can be used as a gas sensor.

Further, for example, the measurement apparatus according to an aspect of the present disclosure may further include a signal processing circuit that measures a spectrum of a physical object based on a result of detection by the detector.

This makes it possible to use the measurement apparatus as a ranging apparatus.

The following describes embodiments in concrete terms with reference to the drawings.

It should be noted that the embodiments to be described below each illustrate a comprehensive and specific example. The numerical values, shapes, materials, constituent elements, placement and topology of constituent elements, steps, orders of steps, or other features that are shown in the following embodiments are just a few examples and are not intended to limit the present disclosure. Further, those of the constituent elements in the following embodiments which are not recited in an independent claim are described as optional constituent elements.

Further, the drawings are schematic views, and are not necessarily strict illustrations. Accordingly, for example, the drawings are not necessarily to scale. Further, in the drawings, substantially the same components are given the same reference signs, and a repeated description may be omitted or simplified.

Further, terms such as "parallel" used herein to show the way in which elements are interrelated, terms such as "rectangular" used herein to show the shape of an element, and ranges of numerical values used herein are not expressions that represent only exact meanings but expressions that are meant to also encompass substantially equivalent ranges, e.g. differences of approximately several percent.

Further, the terms "above" and "below" used herein do not refer to an upward direction (upward in a vertical direction) and a downward direction (downward in a vertical direction) in absolute space recognition, but are used as terms that are defined by a relative positional relationship based on an order of stacking in a stack configuration. Further, the terms "above" and "below" are applied not only in a case where two constituent elements are placed at a spacing from each other with another constituent element present between the two constituent elements, but also in a case where two constituent elements touch each other by being placed in close contact with each other.

Optical Frequency Comb Laser Light and Dual-Comb Spectroscopy

Prior to a description of specific embodiments of the present disclosure, the following briefly describes the basic principles of optical frequency comb laser light and dual-comb spectroscopy.

First, changes in electric field of optical frequency comb laser light over time and the frequency spectrum of optical frequency comb laser light are described with reference to FIGS. 1A and 1B.

FIG. 1A is a diagram schematically showing changes in electric field of optical frequency comb laser light over time. In FIG. 1A, the horizontal axis represents time, and the vertical axis represents the electric filed of the laser light.

As shown in FIG. 1A, the optical frequency comb laser light is formed from optical pulse trains that are generated with a cycle period $T_{rep}$. The cycle period $T_{rep}$ is for example higher than or equal to 100 ps and lower than or equal to 100 ns. The full width at half maximum of each optical pule is represented by $\Delta t$. The full width at half maximum $\Delta t$ of each optical pule is for example greater than or equal to 10 fs and less than or equal to 1 ps.

An optical frequency comb laser light source includes a laser resonator that produces optical frequency comb laser light upon either input of excitation light or charge injection. The laser resonator will be described in detail later. The laser resonator may differ between a group velocity $v_g$ at which an envelope of an optical pulse propagates and a phase velocity $v_p$ at which a wave in an optical pulse propagates. Due to the difference between the group velocity $v_g$ and the phase velocity $v_p$, superposing two adjacent optical pulses onto each other so that their envelopes coincide causes the phases of waves in these optical pulses to shift by $\Delta\varphi$. $\Delta\varphi$ is smaller than $2\pi$. The cycle period of optical pulse trains is represented by $T_{rep}=L/v_g$, where L is the round-trip length of the laser resonator.

Figure 1B:
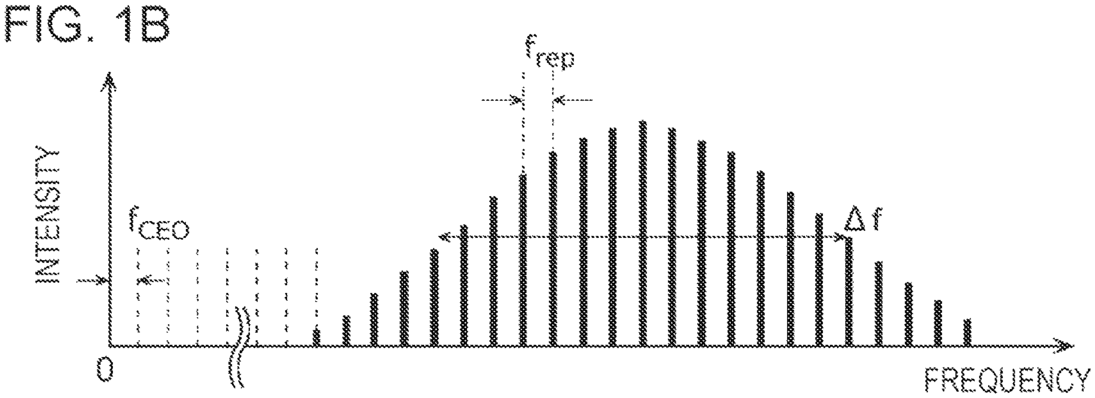
FIG. 1B is a diagram schematically showing the frequency spectrum of optical frequency comb laser light.

FIG. 1B is a diagram schematically showing the frequency spectrum of optical frequency comb laser light. In FIG. 1B, the horizontal axis represents frequency, and the vertical axis represents the intensity of the laser light.

As shown in FIG. 1B, the optical frequency comb laser light has a comb-shaped frequency spectrum formed from a plurality of discrete, equally spaced lines. The frequency of the plurality of discrete, equally spaced lines is equivalent to the resonant frequency of longitudinal modes in the laser resonator. A repetition frequency equivalent to the spacing between two adjacent equally spaced lines in an optical frequency comb is represented by $f_{rep}=1/T_{rep}$. The repetition frequency $f_{rep}$ is for example higher than or equal to 10 MHz and lower than or equal to 10 GHz. The optical path length L of the laser resonator is 30 cm, and in a case where the group velocity vg is substantially equal to the velocity of light in vacuum ($=3\times10^8$ m/s), the cycle period $T_{rep}$ is 1 ns and the repetition frequency $f_{rep}$ is 1 GHz.

In a case where the full width at half maximum of the optical frequency comb is $\Delta f$, $\Delta f=1/\Delta t$. The full width at half maximum of the optical frequency comb is for example greater than or equal to 1 THz and less than or equal to 100 THz. The frequency of equal-spaced lines closest to zero frequency in a case where it is assumed that the equally spaced lines are present close to the zero frequency is called "carrier-envelope offset frequency". The carrier-envelope offset frequency is represented by $f_{CEO}=(\Delta\varphi/(2\pi))f_{rep}$. The carrier-envelope offset frequency $f_{CEO}$ is lower than the repetition frequency $f_{rep}$. Assuming that the carrier-envelope offset frequency $f_{CEO}$ is the zeroth mode frequency, the nth mode frequency $f_n$ in the optical frequency comb is represented by $f_n = f_{CEO} + nf_{rep}$. The electric field E(t) of the optical frequency comb laser light shown in FIG. 1A is represented by $E(t) = \Sigma n E_n \exp[-i(2\pi f_n t + \varphi_n)]$, where $E_n$ and $\varphi_n$ are the amplitude and phase, respectively, of the electric filed at the nth mode frequency fn.

Next, two types of optical frequency comb laser light source that are integrated on a semiconductor substrate are briefly described with reference to FIGS. 2, 3A, and 3B.

Figure 2:
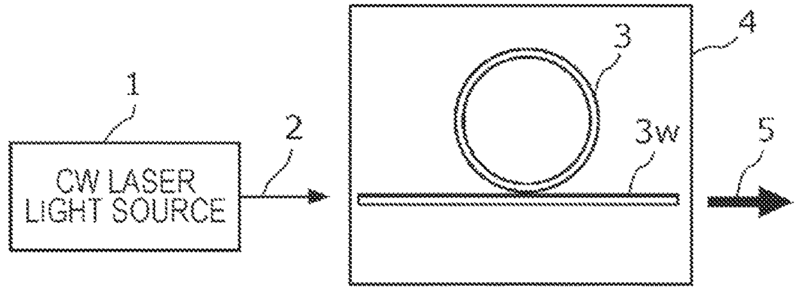
FIG. 2 is a diagram schematically showing an optical frequency comb laser light source having a ring resonator integrated on a semiconductor substrate.

FIG. 2 is a diagram schematically showing an optical frequency comb laser light source having an external light source and a ring resonator. As shown in FIG. 2, the optical frequency comb laser light source includes an optical waveguide 3*w*, a ring resonator 3, and a semiconductor substrate 4. The optical waveguide 3*w* and the ring resonator 3 are integrated on the semiconductor substrate 4. A CW laser light source 1 is not integrated on the semiconductor substrate 4.

The CW laser light source 1 emits laser light 2. Note, however, that the laser light 2 has a single longitudinal mode, and is adjusted to the resonant frequency of the ring resonator 3. The CW laser light source 1 emits the laser light 2 toward the semiconductor substrate 4.

The inputting of the laser light 2 to the ring resonator 3 through the optical waveguide 3*w* integrated on the semiconductor substrate 4 induces optical four-wave mixing, which is a non-linear optical effect, in the ring resonator 3. This causes optical frequency comb laser light 5 to be generated from the semiconductor substrate 4. At this point in time, $f_{rep}$ is equal to a value obtained by dividing the velocity of light by the optical path length of the ring resonator 3. The optical path length of the ring resonator 3 is obtained by multiplying the resonator length of the ring resonator 3 by a refractive index. The resonator length is the length of the circumference of a ring-shaped optical path.

Figure 3A:
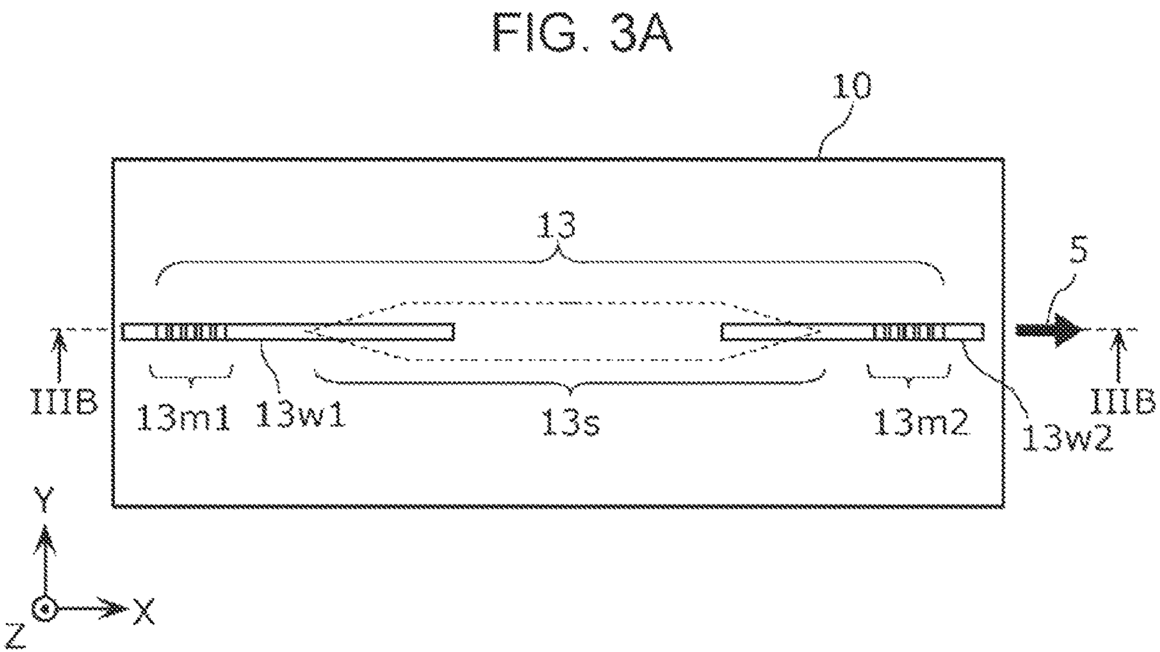
FIG. 3A is a top view schematically showing an optical frequency comb laser light source having a gain-medium-containing resonator integrated on a semiconductor substrate.

FIG. 3A is a top view schematically showing an optical frequency comb laser light source having a gain-medium-containing resonator integrated on a semiconductor substrate. FIG. 3B is a cross-sectional view schematically showing the optical frequency comb laser light source as taken along line IIIB-IIIB in FIG. 3A. For reference, X, Y, and Z axes orthogonal to one another are schematically shown. However, these axes are for convenience of explanation and are not intended to limit orientation during use.

Figure 3B:
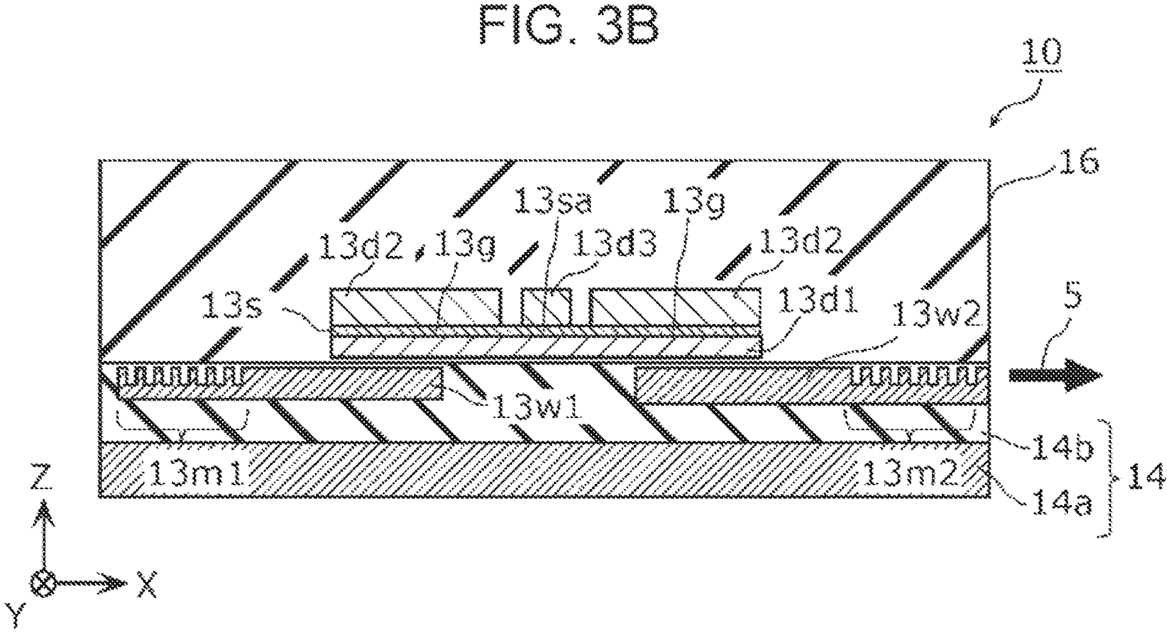
FIG. 3B is a cross-sectional view schematically showing the optical frequency comb laser light source as taken along line IIIB-IIIB in FIG. 3A.

An optical frequency comb laser light source 10 shown in FIGS. 3A and 3B includes a resonator 13, a semiconductor substrate 14, and a protective layer 16. In the example illustrated, the semiconductor substrate 14 has a surface parallel to an X-Y plane. As shown in FIG. 3B, the semiconductor substrate 14 has, for example, a stack structure in which a high-refractive-index layer 14*a* of Si or other substances and a low-refractive-index layer 14*b* of $SiO_2$ or other substances are stacked in this order in a direction parallel with the Z axis. The refractive index of the high-refractive-index layer 14*a* is higher than the refractive index of the low-refractive-index layer 14*b*. The semiconductor substrate 14 may not include the high-refractive-index layer 14*a*. The protective layer 16 may be formed of an inorganic insulating material such as $SiO_2$ or an organic insulating material such as BCB (benzocyclobutene). The protective layer 16 is provided so as to cover an upper surface of the low-refractive-index layer 14*b*.

The resonator 13 is an example of a laser resonator having a predetermined optical path length. As shown in FIG. 3A, the resonator 13 includes a semiconductor layer 13*s*, optical waveguides 13*w*1 and 13*w*2, and mirrors 13*m*1 and 13*m*2. Further, as shown in FIG. 3B, the resonator 13 includes an n-doped layer 13*d*1 and p-doped layers 13*d*2 and 13*d*3. Further, the resonator 13 includes a gain medium 13*g* and a saturable absorber 13*sa*. Parts of the semiconductor layer 13*s* function as the gain medium 13*g* and the saturable absorber 13*sa*, respectively.

In FIG. 3A, the shape of the semiconductor layer 13*s* of the resonator 13 in plan view is represented by dotted lines. The semiconductor layer 13*s* has both ends tapered. The tapered ends separately overlap each of the optical waveguides 13*w*1 and 13*w*2 in top view. This causes light passing through the semiconductor layer 13*s* to be efficiently propagated to each of the optical waveguides 13*w*1 and 13*w*2.

As shown in FIG. 3B, the optical waveguide 13*w*1 of the resonator 13 is buried in the low-refractive-index layer 14*b* of the semiconductor substrate 14. The optical waveguide 13*w*1 may be provided on top of the low-refractive-index layer 14*b*. The optical waveguide 13*w*1 may be formed from at least one high-refractive-index material selected from the group consisting of Si and SiN. The refractive index of the optical waveguide 13*w*1 is higher than the refractive index of the low-refractive-index layer 14*b* of the semiconductor substrate 14 and the refractive index of the protective layer 16. This allows light to propagate through the optical waveguide 13*w*1 by total reflection. The same applies to the optical waveguide 13*w*2.

The mirror 13*m*1 may be formed, for example, from a distributed Bragg reflector. In the distributed Bragg reflector, light is reflected by Bragg reflection attributed to a refractive-index periodic structure. The mirror 13*m*1 is provided at an end of the optical waveguide 13*w*1. The mirror 13*m*1 reflects light having propagated through the optical waveguide 13*w*1. The mirror 13*m*1 may be formed, for example, from metal, provided it has a reflex function. The same applies to the mirror 13*m*2. The mirror 13*m*2 is provided at an end of the optical waveguide 13*w*2. The mirror 13*m*2 reflects light having propagated through the optical waveguide 13*w*2.

The mirror 13*m*2 is lower in reflectivity than the mirror 13*m*1. Specifically, since the reflectivity of the mirror 13*m*1 is substantially equal to 100%, the reflectivity of the mirror 13*m*2 is for example 90%. The mirror 13*m*2 reflects a large portion of light having propagated through the optical waveguide 13*w*2, but transmits a portion of the light as-is. Light transmitted through the mirror 13*m*2 turns into optical frequency comb laser light 5.

As shown in FIG. 3B, the semiconductor layer 13*s* is sandwiched between the n-doped layer 13*d*1 and the p-doped layers 13*d*2 and 13*d*3. The positional relationship between the n-doped layer 13*d*1 and the p-doped layers 13*d*2 and 13*d*3 may be inverted.

The semiconductor layer 13*s*, the n-doped layer 13*d*1, and the p-doped layers 13*d*2 and 13*d*3 are buried in the protective layer 16. It should be noted that a lower surface of the n-doped layer 13*d*1 may be in contact with a surface of the semiconductor substrate 14. Both ends of the n-doped layer 13*d*1 may be in contact with the optical waveguides 13*w*1 and 13*w*2, respectively.

The semiconductor layer 13*s* may be formed, for example, from a III-V semiconductor material. The III-V semiconductor material may include, for example, at least one material selected from the group consisting of ZnSe, InGaAlP, InGaAs, GaInAsP, GaInAsSb, InP, GaN, GaAs, InGaAs, AlGaAs, and AlInGaN.

The semiconductor layer 13*s* includes the gain medium 13*g* and the saturable absorber 13*sa*. The gain medium 13*g* is part of the semiconductor layer 13*s* sandwiched between the n-doped layer 13*d*1 and the p-doped layer 13*d*2. The saturable absorber 13_sa_ is part of the semiconductor layer 13_s_ sandwiched between the n-doped layer 13_d_1 and the p-doped layer 13_d_3.

The n-doped layer 13_d_1 is an n-type semiconductor layer. The n-doped layer 13_d_1 is formed by doping the same III-V semiconductor material as that of the semiconductor layer 13_s_ with an n-type impurity. Usable examples of such n-type impurities include a quadrivalent element such as Si and a hexavalent element such as serene (Se).

The p-doped layers 13_d_2 and 13_d_3 are p-type semiconductor layers. The p-doped layers 13_d_2 and 13_d_3 are formed by doping the same III-V semiconductor material as that of the semiconductor layer 13_s_ with a p-type impurity. Usable examples of such p-type impurities include a divalent element such as zinc (Zn). The p-doped layers 13_d_2 and 13_d_3 have, for example, the same composition.

The p-doped layers 13_d_2 and 13_d_3 are separated from each other. Different electrodes (not illustrated) are attached separately to each of the p-doped layers 13_d_2 and 13_d_3. An electric current is injected via the electrode into the p-doped layer 13_d_2. A reverse bias voltage is applied between the p-doped layer 13_d_3 and the n-type doped layer 13_d_1. In the presence of the application of this voltage, part of the semiconductor layer 13_s_ that is in contact with the p-doped layer 13_d_3 functions as the saturable absorber 13_sa_. It should be noted that the saturable absorber 13_sa_ may be formed of a carbon nanotube. The saturable absorber 13_sa_ may be integrated with the mirrors 13_m_1 and 13_m_2.

As in the case of the p-doped layer 13_d_2, an electrode (not illustrated) is attached to the n-doped layer 13_d_1 too. Part of the semiconductor layer 13_s_ into which electric charge has been injected from the electrodes attached separately to each of the n-doped and p-doped layers 13_d_1 and 13_d_2 functions as the gain medium 13_g_, into which light is stimulatedly emitted. The light thus stimulatedly emitted is repeatedly reflected between the mirror 13_m_1 and the mirror 13_m_2 via the optical waveguide 13_w_2. That is, the light is amplified by passing through the gain medium 13_g_ again and again. The light thus amplified turns into an optical pulse train mode-locked by the saturable absorber 13_sa_. Only a wavelength corresponding to the product obtained by multiplying the optical path length, i.e. the resonator length, of the resonator 13 by a refractive index is amplified. This causes the optical frequency comb laser light 5 to be produced from the resonator 13. It should be noted that the optical path length of the resonator 13 is an optical path length between the mirror 13_m_1 and the mirror 13_m_2.

Next, the principles of dual-comb spectroscopy are briefly described with reference to FIGS. 4 and 5.

Figure 4:
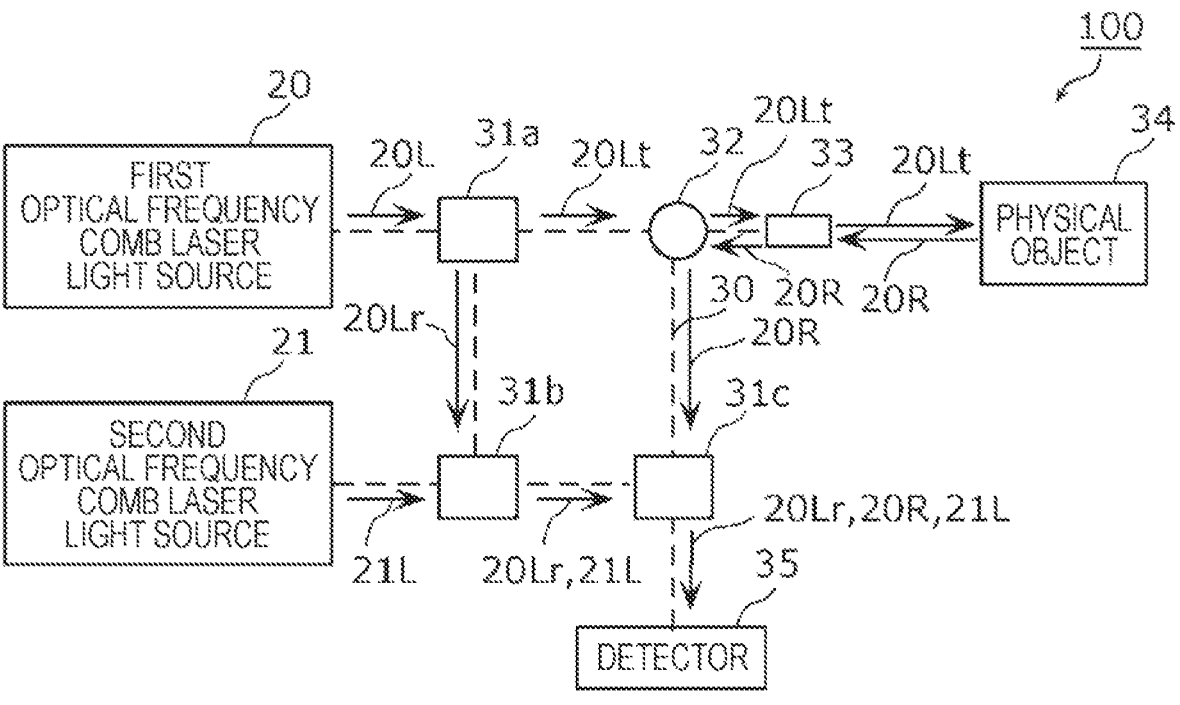
FIG. 4 is a diagram schematically showing an optical system in dual-comb spectroscopy.

FIG. 4 is a diagram schematically showing an optical system in dual-comb spectroscopy. A measurement apparatus 100 shown in FIG. 4 includes a first optical frequency comb laser light source 20, a second optical frequency comb laser light source 21, an optical fiber 30, couplers 31_a_, 31_b_, and 31_c_, a circulator 32, a collimator 33, and a detector 35. In FIG. 4, a path of the optical fiber 30 is represented by dashed lines.

The first optical frequency comb laser light source 20 includes a first laser resonator (not illustrated) that produces first optical frequency comb laser light 20L. The second optical frequency comb laser light source 21 includes a second laser resonator (not illustrated) that produces second optical frequency comb laser light 21L. The optical path length of the first laser resonator and the optical path length of the second laser resonator are different from each other.

The first optical frequency comb laser light 20L has a first optical frequency comb whose nth mode frequency $f_{1n}$ is represented by $f_{1n}=f_{CEO1}+nf_{rep1}$. The second optical frequency comb laser light 21L has a second optical frequency comb whose nth mode frequency $f_{2n}$ is represented by $f_{2n}=f_{CEO2}+nf_{rep2}$. $f_{CEO1}$ and $f_{CEO2}$ are the carrier-envelope offset frequencies of the first and second optical frequency combs, respectively. $f_{rep1}$ and $f_{rep2}$ are the repetition frequencies of the first and second optical frequency combs, respectively. $f_{rep1}$ and $f_{rep2}$ are slightly different from each other, so that the relationship "$f_{rep1}=f_{rep2}+\delta_1$" holds. $\delta_1$ is far smaller than $f_{rep1}$. $\delta_1$ is for example approximately $1/10^3$ to $1/10^9$ of $f_{rep1}$ and, as an example, is greater than 0 Hz and less than or equal to 10 MHz.

As shown in FIG. 4, the constituent elements of the measurement apparatus 100 are all connected by the optical fiber 30. That is, optical elements such as the couplers 31_a_, 31_b_, and 31_c_, the circulator 32, the collimator 33, and the detector 35 are placed on the path of the optical fiber 30. The first optical frequency comb laser light source 20 and the second optical frequency comb laser light source 21 are connected to ends of the optical fiber 30.

The couplers 31_a_, 31_b_, and 31_c_ are each an optical element that performs optical branching or optical coupling. The circulator 32 is an optical element that controls where light travels. The collimator 33 is an optical element that makes rays of light parallel and emit them. The detector 35 is an optical element that photoelectrically converts incoming light into an electric signal and outputs it. The signal level of the electric signal corresponds to the intensity of the incoming light. The detector 35 is for example a photoelectric conversion element such as a photodiode or a phototransistor.

The first optical frequency comb laser light 20L is divided by the coupler 31_a_ into two beams of light 20Lt and 20Lr. The light 20Lt passes through the circulator 32, is emitted from the collimator 33, and strikes a physical object 34. Then, the light 20Lt is reflected off the physical object 34. Reflected light 20R strikes the collimator 33, and then the circulator 32 causes the reflected light 20R to travel toward the coupler 31_c_. Meanwhile, the light 20Lr travels from the coupler 31_a_ toward the coupler 31_b_ and is coupled to the second optical frequency comb laser light 21L by the coupler 31_b_, and the light 20Lr and the second optical frequency comb laser light 21L travel toward the coupler 31_c_. Then, the reflected light 20R, the light 20Lr, and the second optical frequency comb laser light 21L are coupled together by the coupler 31_c_ and travel toward the detector 35. These beams of light interfere with one another in the detector 35, whereby beats occur.

Figure 5:
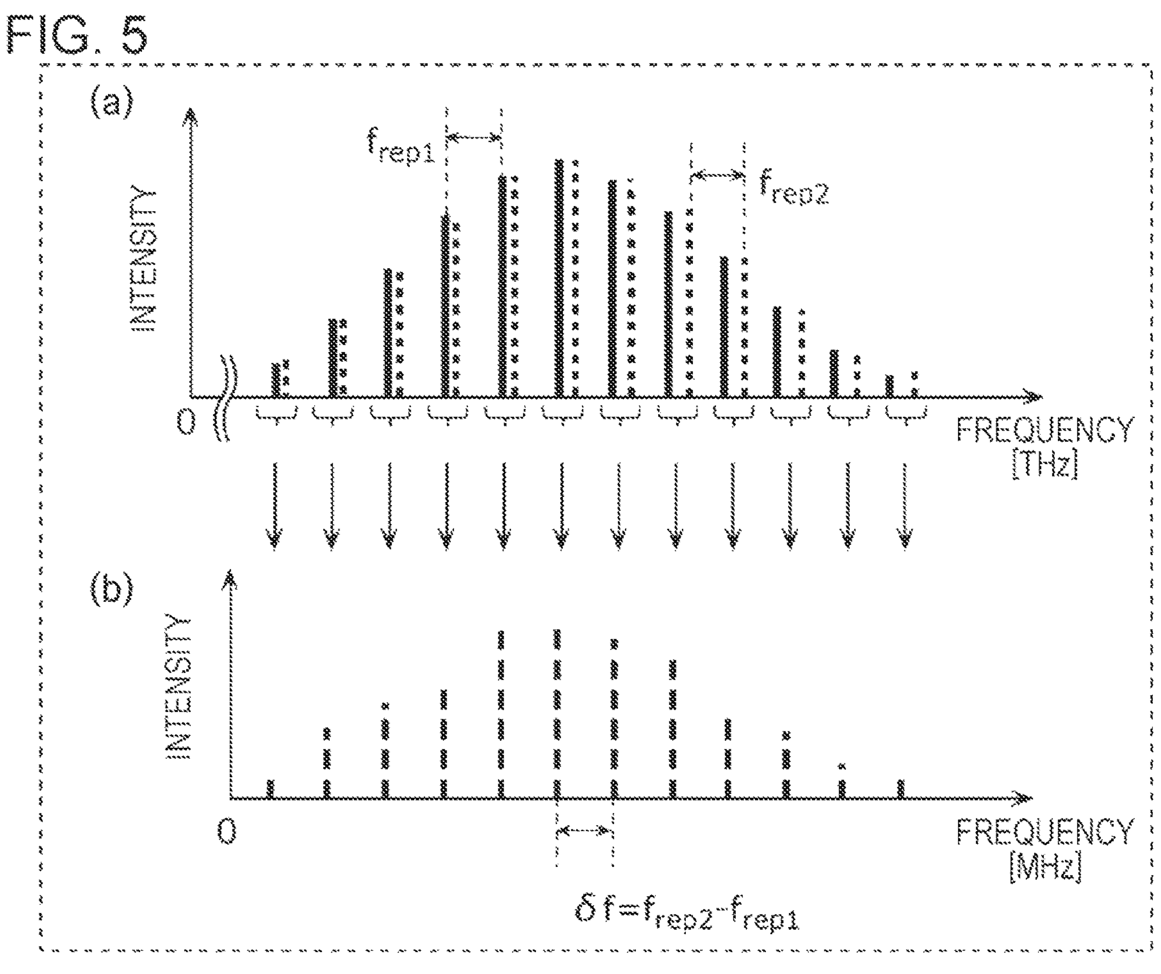
FIG. 5 is a diagram for explaining the principles by which to obtain frequency spectra of light in dual-comb spectroscopy.

FIG. 5 is a diagram for explaining the principles by which to obtain frequency spectra of light in dual-comb spectroscopy. (a) of FIG. 5 schematically shows the spectra of the first and second optical frequency combs. The solid lines represent the first optical frequency comb, and the dashed lines represent the second optical frequency comb. (b) of FIG. 5 is a diagram schematically showing the beat frequency spectrum of interfering light. The difference in nearest neighbor mode frequency between the first optical frequency comb and the second optical frequency comb is equivalent to the beat frequency.

From the beat frequency spectrum, the characteristics regarding the optical frequency of the physical object 34 can be examined. For example, at which frequency and to what extent the physical object 34 has absorbed light can be examined. If one of the plurality of mode frequencies in the first optical frequency comb coincides with one of the plurality of mode frequencies in the second optical frequency comb, a beat frequency of zero appears. This makes it possible to easily examine the characteristics regarding the optical frequency of the physical object 34 with reference to the mode frequencies that coincide with each other.

Dual-comb spectroscopy has an advantage in that information on light at high frequencies of the order of terahertz (THz) can be acquired by downconversion into radio frequencies of the order of megahertz (MHz). The time waveform of signal waves at frequencies of the order of gigahertz (GHz) or lower can be detected by a common detector.

However, it is difficult to detect the time waveform of signal waves at frequencies of the order of THz or higher with a common detector. For this reason, signal waves at frequencies of the order of THz or higher are broken up into frequencies for detection by a spectroscope such as a diffraction grating or a prism. Since this frequency sweep requires time, it is impossible to quickly obtain frequency spectra of light.

In dual-comb spectroscopy, the time waveform of beats at radio frequencies can be detected by a common detector. Performing Fourier transformation on the time waveform of beats makes it possible to quickly obtain a beat frequency spectrum such as that shown in (b) of FIG. 5. This makes it possible to quickly obtain frequency spectra of light at high frequencies with high accuracy.

The inventors came up with their findings that a dual optical frequency comb generator can be simply achieved by integrating, on the same semiconductor substrate that on which the first optical frequency comb laser light source 20 and the second optical frequency comb laser light source 21 are integrated, some of the optical elements placed on the path of the optical fiber 30 shown in FIG. 4. The following describes specific embodiments.

Embodiment 1

Figure 6:
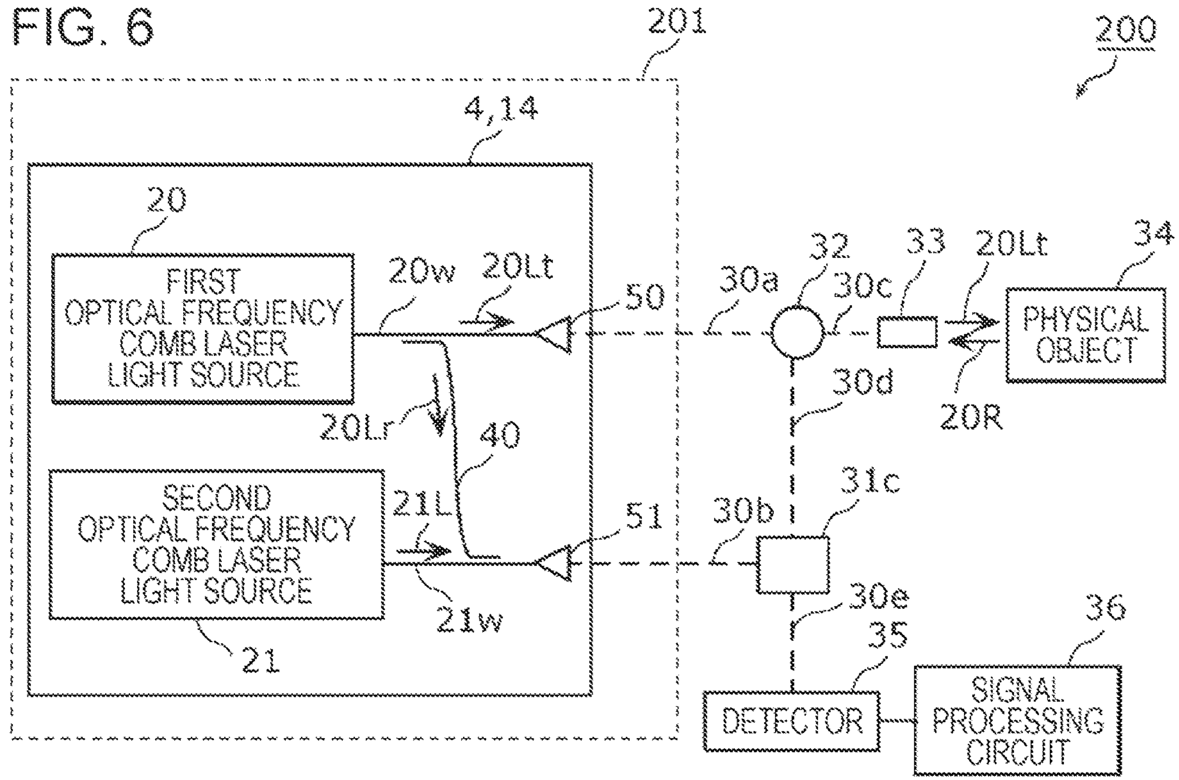
FIG. 6 is a diagram schematically showing a configuration of a dual optical frequency comb generator and a measurement apparatus according to Embodiment 1.

First, an example configuration of a dual optical frequency comb generator and a measurement apparatus according to Embodiment 1 is described with reference to FIG. 6. FIG. 6 is a diagram schematically showing a configuration of a dual optical frequency comb generator and a measurement apparatus according to the present embodiment.

A measurement apparatus 200 includes a dual optical frequency comb generator 201, a plurality of optical fibers 30*a*, 30*b*, 30*c*, 30*d*, and 30*e*, a coupler 31*c*, a circulator 32, a collimator 33, a detector 35, and a signal processing circuit 36.

The dual optical frequency comb generator 201 includes a first optical frequency comb laser light source 20, a second optical frequency comb laser light source 21, two outputters 50 and 51, an optical waveguide 20*w*, an optical waveguide 21*w*, and an optical waveguide 40. They are all integrated on an identical semiconductor substrate 4 or 14. In the following description, the first optical frequency comb laser light source 20 is simply referred to as "first laser light source 20", and the second optical frequency comb laser light source 21 is simply referred to as "second laser light source 21".

The first laser light source 20 includes a first laser resonator having a first optical path length. An optical path length is equivalent to the product of an actual distance and a refractive index. Further, the second laser light source 21 includes a second laser resonator having a second optical path length. The first laser light source 20 and the second laser light source 21 here refer to the two types of optical frequency comb laser light source, described in FIG. 2 or FIGS. 3A and 3B, that can be integrated on a semiconductor substrate, respectively. It should be noted that the first laser light source 20 and the second laser light source 21 are for example of the same type.

For example, on the semiconductor substrate 4 shown in FIG. 2, the ring resonator 3 and optical waveguide 3*w* of the first laser light source 20, the ring resonator 3 and optical waveguide 3*w* of the second laser light source 21, the optical waveguides 20*w*, 21*w*, and 40, and the outputters 50 and 51 are formed. The optical path length of the ring resonator 3 of the first laser light source 20 and the optical path length of the ring resonator 3 of the second laser light source 21 are different from each other. The CW laser light source 1 may or may not be integrated on the semiconductor substrate 4.

Alternatively, on the semiconductor substrate 14 shown in FIG. 3B, the resonator 13 of the first laser light source 20, the resonator 13 of the second laser light source 21, the optical waveguides 20*w*, 21*w*, and 40, and the outputters 50 and 51 are formed. The optical path length of the resonator 13 of the first laser light source 20 and the optical path length of the resonator 13 of the second laser light source 21 are different from each other. For example the distance between the mirrors 13*m*1 and 13*m*2 of the first laser light source 20 and the distance between the mirrors 13*m*1 and 13*m*2 of the second laser light source 21 may be different from each other.

The optical waveguide 20*w* is an example of a first optical waveguide connecting the first laser light source 20 with the outputter 50. The optical waveguide 21*w* is an example of a second optical waveguide connecting the second laser light source 21 with the outputter 51.

The optical waveguide 40 is an example of a third optical waveguide that branches off from the optical waveguide 20*w* and joins the optical waveguide 21*w*. That is, the optical waveguide 40 has a role as a divider in the optical waveguide 20*w* and has a role as a coupler in the optical waveguide 21*w*. The optical waveguide 40 plays the role of the couplers 31*a* and 31*b* shown in FIG. 4. The optical waveguide 40 is for example, but is not limited to, a structure based on evanescent coupling. The optical waveguide 40 may for example be a Y-shaped waveguide, provided it has dividing and coupling functions.

The optical waveguides 20*w*, 21*w*, and 40 are each formed on the semiconductor substrate 4 or 14. For example, as with the optical waveguides 13*w*1 and 13*w*2 shown in FIG. 3B, the optical waveguides 20*w*, 21*w*, and 40 are each formed of a material that is higher in refractive index than the low-refractive-index layer 14*b* and buried in the low-refractive-index layer 14*b*. For example, the optical waveguides 20*w*, 21*w*, and 40 are formed of a material such as Si or SiN.

The outputter 50 is an example of a first outputter, and outputs laser light emitted from the first laser light source 20. Specifically, first optical frequency comb laser light 20L emitted from the first laser light source 20 is separated into light 20Lt that is propagated through the optical waveguide 20*w* and light 20Lr that is propagated through the optical waveguide 40. Of these beams of light, the outputter 50 outputs the light 20Lt.

The outputter 51 is an example of a second outputter, and outputs light produced by coupling of the laser light emitted from the first laser light source 20 and laser light emitted from the second laser light source 21. Specifically, the outputter 51 outputs second optical frequency comb laser light 21L emitted from the second laser light source 21 and the light 20Lr propagated through the optical waveguide 40.

The outputters 50 and 51 each include an optical fiber coupler. The outputters 50 and 51 are for example, but are not limited to, grating couplers. The outputters 50 and 51 may produce output based, for example, on edge coupling, provided light inside an optical waveguide can be outputted.

The optical fiber 30*a* is an example of a first optical fiber, and has a first end connected to the outputter 50 and a second end connected to the circulator 32. The optical fiber 30*a* propagates, to the circulator 32, the light 20Lt produced by the first laser light source 20, passed through the optical waveguide 20*w*, and emitted from the outputter 50.

The optical fiber 30*b* is an example of a second optical fiber, and has a first end connected to the outputter 51 and a second end connected to the coupler 31*c*. The optical fiber 30*b* propagates, to the coupler 31*c*, the light 20Lr produced by the first laser light source 20, passed through the optical waveguide 40, and emitted from the outputter 51 and the second optical frequency comb laser light 21L (hereinafter simply referred to as "light 21L") produced by the second laser light source 21, passed through the optical waveguide 21*w*, and emitted from the outputter 51.

The optical fiber 30*c* is an example of a third optical fiber, and has a first end connected to the circulator 32 and a second end connected to the collimator 33. The optical fiber 30*c* propagates, to the collimator 33, the light 20Lt propagated through the optical fiber 30*a* and passed through the circulator 32. Further, the optical fiber 30*c* propagates, to the circulator 32, reflected light 20R from a physical object 34 that has struck the collimator 33. It should be noted that the circulator 32 is configured such that the light 20Lt does not strike the optical fiber 30*d*.

The optical fiber 30*d* is an example of a fourth optical fiber, and has a first end connected to the circulator 32 and a second end connected to the coupler 31*c*. The optical fiber 30*d* propagates, to the coupler 31*c*, the reflected light 20R propagated through the optical fiber 30*c* and passed through the circulator 32. It should be noted that the circulator 32 is configured such that the reflected light 20R does not strike the optical fiber 30*a*.

The optical fiber 30*e* is an example of a fifth optical fiber, and has a first end connected to the coupler 31*c* and a second end connected to the detector 35. The optical fiber 30*e* propagates, to the detector 35, the reflected light 20R propagated through the optical fiber 30*d* and the light 20Lr and 21L propagated through the optical fiber 30*b*.

In the detector 35, beats occurs due to interference between the reflected light 20R and the light 21L and interference between the light 20Lr and the light 21L. The beat based on the interference between the reflected light 20R and the light 21L is signal light corresponding to the characteristics of the physical object 34. The beat based on the interference between the light 20Lr and the light 21L is reference light.

Figure 7:
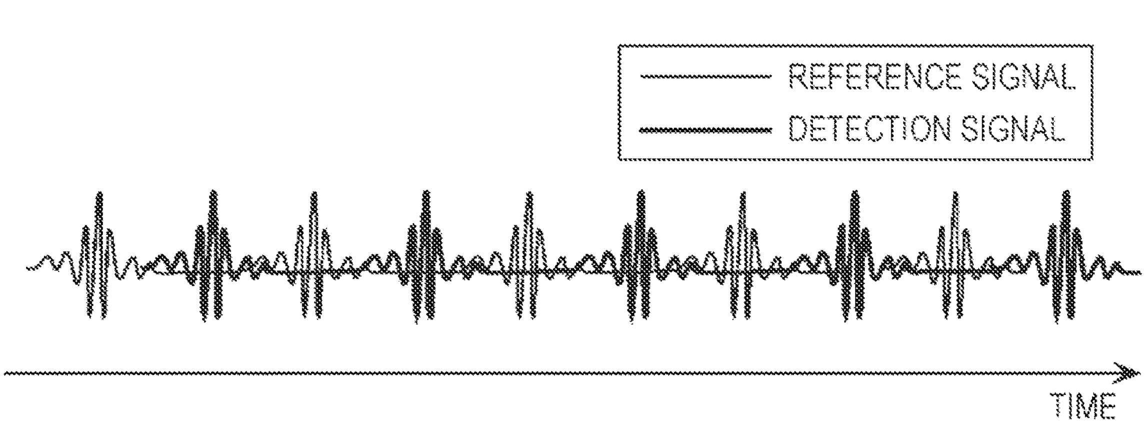
FIG. 7 is a diagram showing examples of electric signals that a detector generates.

The detector 35 photoelectrically converts the beats into electric signals such as those shown in FIG. 7. FIG. 7 is a diagram showing examples of electric signals that the detector generates. As shown in FIG. 7, the electric signals include a detection signal that is equivalent to the signal light and a reference signal that is equivalent to the reference light.

The signal processing circuit 36 measures the spectrum of the physical object 34 based on a result of detection by the detector 35. Specifically, the signal processing circuit 36 performs Fourier transformation on the detection signal and the reference signal. As a result, beat frequency spectra such as that shown in (b) of FIG. 5 are obtained for both the detection signal and the reference signal. By comparing the beat frequency spectrum of the detection signal with the beat frequency spectrum of the reference signal, the signal processing circuit 36 can identify, for example, a frequency component absorbed by the physical object 34. This makes it possible to measure the spectrum of the physical object 34.

Further, the signal processing circuit 36 may measure the distance to the physical object 34 based on the result of detection by the detector 35. Specifically, the signal processing circuit 36 measures a time difference between the detection signal and the reference signal and measures the distance to the physical object 34 based on a TOF (time-of-flight) analysis. Alternatively, the signal processing circuit 36 may, by performing Fourier transformation of the respective time waveforms of the detection signal and the reference signal, acquire two pieces of phase information on the detection signal and the reference signal, respectively, and measure the distance to the physical object 34 based on the difference between the two pieces of phase information thus acquired.

As noted above, the measurement apparatus 200 according to the present embodiment has more optical elements integrated on the semiconductor substrate 4 or 14 than does a conventional dual-comb spectroscopic optical system. This makes it possible to achieve an unprecedentedly small size and unprecedentedly high resistance to external perturbations and to simply perform dual-comb spectroscopy.

Further, for example, the numbers and placement of couplers 31*c*, circulators 32, collimators 33, and optical fibers are freely subject to design change. This makes it possible to enhance the versatility of the measurement apparatus 200. Further, an optical loss on the semiconductor substrate can be reduced, as the risk of failure in a semiconductor process is lower than in a case where the coupler 31*c*, the circulator 32, and the collimator 33 are all integrated on the semiconductor substrate. This makes it possible to bring about improvement in manufacturing yield. Furthermore, the reflected light 20R, which arrives at the detector 35 without passing through the outputters 50 and 51, which include couplers each coupling an optical fiber to a waveguide on the semiconductor substrate, is not affected by optical losses caused by the couplers. This makes it possible to reduce the size of the measurement apparatus 200 without decreasing detection sensitivity.

Modification 1

Figure 8:
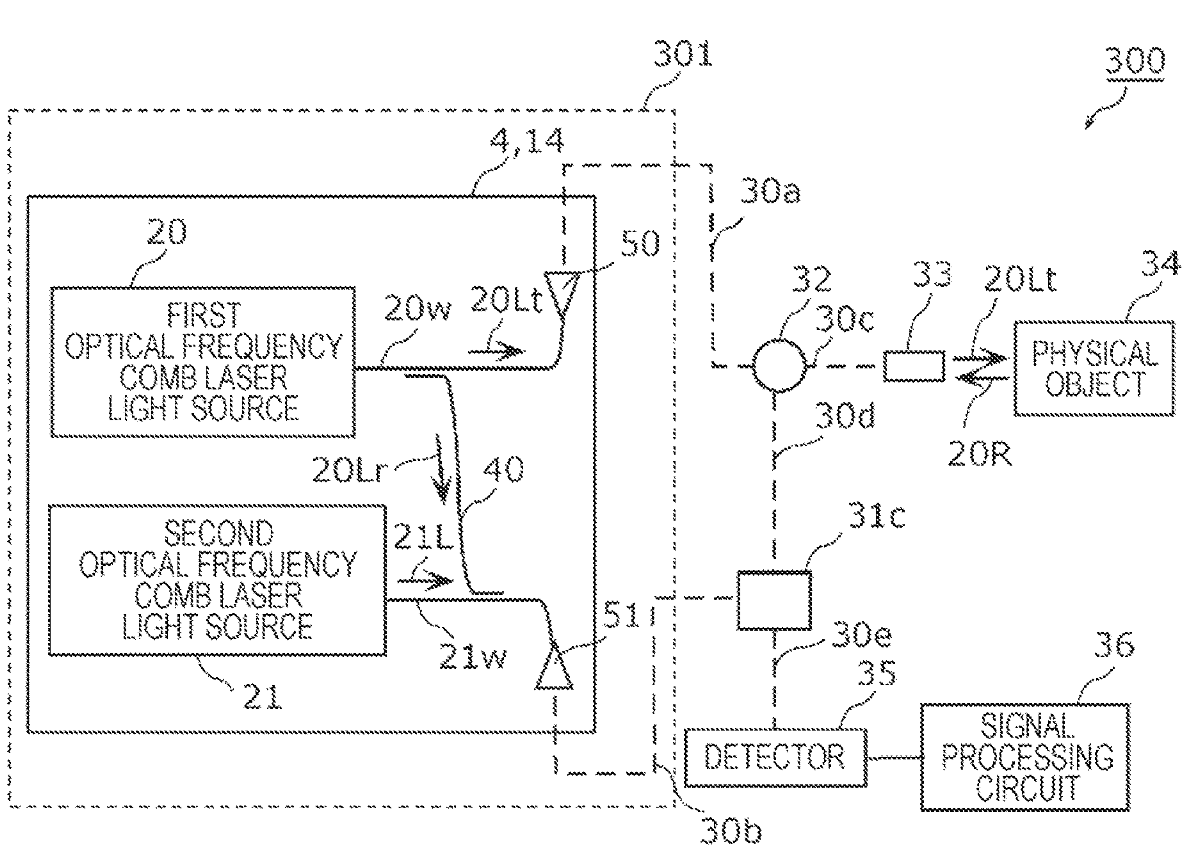
FIG. 8 is a diagram schematically showing a configuration of a dual optical frequency comb generator and a measurement apparatus according to Modification 1 of Embodiment 1.

The following describes a modification of Embodiment 1 with reference to FIG. 8. FIG. 8 is a diagram schematically showing a configuration of a dual optical frequency comb generator and a measurement apparatus according to a modification of Embodiment 1.

A measurement apparatus 300 shown in FIG. 8 differs from the measurement apparatus 200 shown in FIG. 6 in that the measurement apparatus 300 includes a dual optical frequency comb generator 301 instead of the dual optical frequency comb generator 201. The only difference between the dual optical frequency comb generator 301 and the dual optical frequency comb generator 201 is the positional relationship between the two outputters 50 and 51. In the case of the dual optical frequency comb generator 201 shown in FIG. 6, the two outputters 50 and 51 are both located on an identical side of the semiconductor substrate 4 or 14. In the present modification, on the other hand, the outputters 50 and 51 are located on sides of the semiconductor substrate 4 or 14 that are different from each other. For example, in a case where the semiconductor substrate 4 or 14 is rectangular in shape in plan view, the side on which the outputter 50 is provided and the side on which the outputter 51 is provided are opposite sides. This causes the outputter 50 to emit light in a direction opposite to that in which the outputter 51 emits light.

In actuality, the length of one side of the semiconductor substrate 4 or 14 may be only several centimeters. This makes it physically difficult to connect the two outputters 50 and 51 to optical fibers in a case where the two outputters 50 and 51 are closed to each other. On the other hand, the present modification makes it possible to place the two outputters 50 and 51 at a longer distance from each other. This makes it possible to easily connect the two outputters 50 and 51 separately to each of the optical fibers 30*a* and 30*b*.

Modification 2

Figure 9:
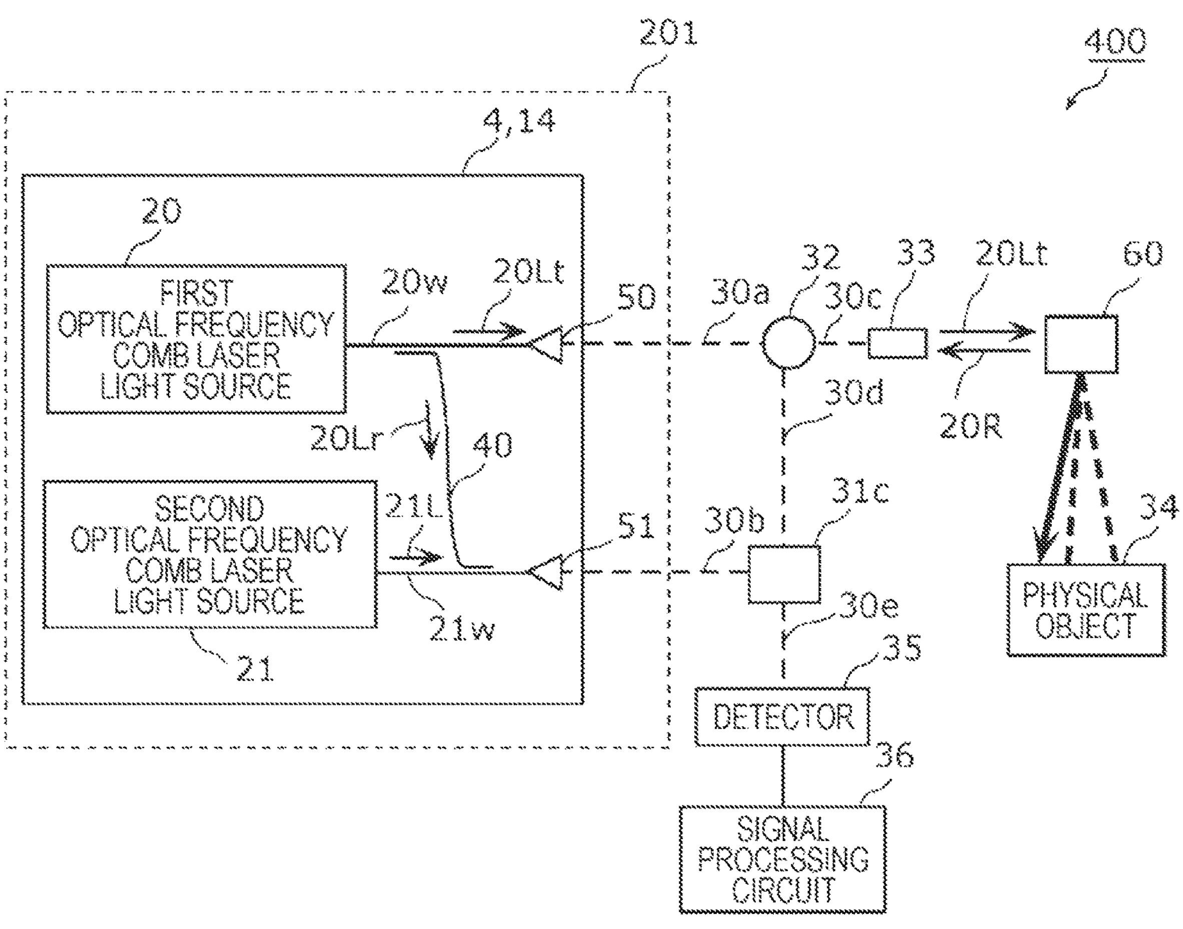
FIG. 9 is a diagram schematically showing a configuration of a dual optical frequency comb generator and a measurement apparatus according to Modification 2 of Embodiment 1.

The following describes Modification 2 of Embodiment 1 with reference to FIG. 9. FIG. 9 is a diagram schematically showing a configuration of a dual optical frequency comb generator and a measurement apparatus according to Modification 2 of Embodiment 1.

A measurement apparatus 400 shown in FIG. 9 differs from the measurement apparatus 200 shown in FIG. 6 in that the measurement apparatus 400 further includes a scanning mechanism 60. The scanning mechanism 60 is an example of a sweeping mechanism that sweeps the light 20Lt emitted from the collimator 33. The scanning mechanism 60 is for example a galvano scanner. Note, however, that the scanning mechanism 60 may be another optical element, provided it can sweep the light 20Lt two-dimensionally. For example, the scanning mechanism 60 may be a stepping motor that changes, for example, the position and attitude of the collimator 33. By being provided with the scanning mechanism 60, the present modification makes it possible to acquire two-dimensional or three-dimensional information on the physical object 34.

Embodiment 2

The following describes Embodiment 2.

Embodiment 2 differs mainly from Embodiment 1 in that a dual optical frequency comb generator includes three outputters. The following describes Embodiment 2 with a focus on the difference from Embodiment 1 and omits or simplifies a description of common features.

FIG. 10 is a diagram schematically showing a configuration of a dual optical frequency comb generator and a measurement apparatus according to the present embodiment. A measurement apparatus shown in FIG. 10 differs from the measurement apparatus 200 shown in FIG. 6 in that the measurement apparatus 500 includes a dual optical frequency comb generator 501 instead of the dual optical frequency comb generator 201. Further, the measurement apparatus 500 includes two detectors 35*a* and 35*b* instead of the detector 35, and includes an optical fiber 30*f*.

The dual optical frequency comb generator 501 differs from the dual optical frequency comb generator 201 in that the dual optical frequency comb generator 501 further includes an optical waveguide 41 and an outputter 52.

The optical waveguide 41 is an example of a fourth optical waveguide that branches off from a path connecting the second laser light source 21 with the outputter 51 and joins the outputter 52. As with the optical waveguide 40, the optical waveguide 41 is for example, but is not limited to, a structure based on evanescent coupling.

The outputter 52 is an example of a third outputter, and outputs laser light emitted from the second laser light source 21. Specifically, the second optical frequency comb laser light 21L emitted from the second laser light source 21 is separated into light 21Lr that is propagated through the optical waveguide 21*w* and light 21Lt that is propagated through the optical waveguide 41. The outputter 52 outputs the light 21Lt. As with the outputters 50 and 51, the outputter 52 is for example, but is not limited to, a grating coupler.

Thus, the dual optical frequency comb generator 501 is configured such that the second optical frequency comb laser light 21L emitted by the second laser light source 21, as well as the first optical frequency comb laser light 20L emitted by the first laser light source 20, is separated into the two beams of light 21Lt and 21Lr, which can be taken out separately from different outputters.

As shown in FIG. 10, the optical fiber 30*f* is connected to the outputter 51, which outputs the light 20Lr and the light 21Lr. The optical fiber 30*f* is an example of a sixth optical fiber, and has a first end connected to the outputter 51 and a second end connected to the detector 35*b*. The optical fiber 30*f* propagates the light 20Lr and the light 21Lr to the detector 35*b*.

In the detector 35*b*, a beat occurs as reference light due to interference between the light 20Lr and the light 21Lr. The detector 35*b* is an example of a second detector, and is a dedicated detector for detecting the reference light.

The optical fiber 30*b* is connected to the outputter 52, which outputs the light 21Lt. The light 21Lt, which is propagated through the optical fiber 30*b*, is coupled by the coupler 31*c* to the reflected light 20R, which has propagated through the optical fiber 30*d*, passes through the optical fiber 30*e*, and is detected by the detector 35*a*.

In the detector 35*a*, a beat occurs as signal light due to interference between the reflected light 20R and the light 21Lt. The detector 35*a* is a dedicated detector for detecting the signal light.

Thus, in the present embodiment, the dedicated detector 35*a*, which is an example of a first detector and detects the signal light, and the dedicated detector 35*b*, which detects the reference light, are provided. It should be noted that as with the detector 35, the detectors 35*a* and 35*b* are each a photoelectric conversion element such as a photodiode.

For example, the reference light and the signal light shown in FIG. 7 may have their pulses overlapping each other. In a case where the pulses overlap each other, it is impossible to distinguish between the reference light and the signal light with one detector. On the other hand, the present embodiment makes it possible to individually detect the reference light and the signal light even in a case where the reference light and the signal light overlap each other.

It should be noted that in the present embodiment, the three outputters 50, 51, and 52 may be provided on different sides of the semiconductor substrate 4 or 14, as in the case of Modification 1 of Embodiment 1. That is, the outputters may be provided one by one on three sides of the semiconductor substrate 4 or 14.

Other Embodiments

In the foregoing, a dual optical frequency comb generator and a measurement apparatus according to one or more aspects have been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

For example, although the foregoing embodiments and modifications have each illustrated an example in which the reflected light 20R from the physical object 34 is detected with the detector 35 or 35*a*, the detector 35 or 35*a* may detect transmitted light transmitted through the physical object 34.

Further, for example, in Embodiment 2, the optical waveguide 40 may join the outputter 52 after having joined the optical waveguide 41. In this case, the outputter 52 outputs the light 20Lr and the light 21Lr, and is therefore connected via the optical fiber 30*f* to the detector 35*b* for detecting the reference light. The outputter 51 outputs the light 21Lt, and is therefore connected via the optical fiber 30*b*, the coupler 31*c*, and the optical fiber 30*e* to the detector 35*a* for detecting the signal light.

Further, for example, the first laser light source 20 and the second laser light source 21 may be different types of optical frequency comb light source. For example, one of the first and second laser light sources 20 and 21 may include the ring resonator 3 and the optical waveguide 3*w* shown in FIG. 2 and the other of the first and second laser light sources 20 and 21 may include the resonator 13 shown in FIG. 3A.

Further, the foregoing embodiments are subject, for example, to various changes, substitutions, additions, and omissions in the scope of the claims or the scope of equivalents thereof.

The present disclosure is applicable to a dual optical frequency comb generator that is small in size, has resistance to external perturbations, and offers high versatility, and is applicable, for example, to an analyzer, a ranging apparatus, or other apparatuses for a physical object.

What is claimed is:

1. A dual optical frequency comb generator comprising:
a semiconductor substrate;
a first optical frequency comb laser light source including a first resonator;
a second optical frequency comb laser light source including a second resonator and differing in repetition frequency of optical pulses from the first optical frequency comb laser light source;
two or more outputters including a first outputter and a second outputter;
a first optical waveguide connecting the first optical frequency comb laser light source with the first outputter;
a second optical waveguide connecting the second optical frequency comb laser light source with the second outputter; and
a third optical waveguide that branches off from the first optical waveguide and joins the second optical waveguide,
wherein the first optical frequency comb laser light source, the second optical frequency comb laser light source, the two or more outputters, the first optical waveguide, the second optical waveguide, and the third optical waveguide are integrated on the semiconductor substrate, and
the first outputter outputs light propagating through the first optical waveguide, and the second outputter outputs light propagating through the second optical waveguide.

2. The dual optical frequency comb generator according to claim 1, wherein in a plan view of the semiconductor substrate, the first outputter and the second outputter are located on sides of the semiconductor substrate that are different from each other.

3. The dual optical frequency comb generator according to claim 1, wherein the first resonator and the second resonator each contain a gain medium located on an optical path.

4. The dual optical frequency comb generator according to claim 1, wherein the two or more outputters each include an optical fiber coupler.

5. The dual optical frequency comb generator according to claim 1, wherein
the two or more outputters include a third outputter, and
the second optical waveguide includes a fourth optical waveguide that branches off from a path connecting the second optical frequency comb laser light source with the second outputter and joins the third outputter.

6. A measurement apparatus comprising:
the dual optical frequency comb generator according to claim 5;
a first optical fiber having a first end connected to the first outputter;
a second optical fiber having a first end connected to one of the second and third outputters;
a circulator connected to a second end of the first optical fiber;
third and fourth optical fibers each having a first end connected to the circulator;
a collimator connected to a second end of the third optical fiber;
a coupler that couples and outputs beams of light propagated separately through each of the second and fourth optical fibers; and
a detector,
wherein the detector includes
a first detector that detects light outputted from the coupler, and
a second detector that detects light outputted from the other of the second and third outputters.

7. A measurement apparatus comprising:
the dual optical frequency comb generator according to claim 1;
a first optical fiber having a first end connected to the first outputter;
a second optical fiber having a first end connected to the second outputter;
a circulator connected to a second end of the first optical fiber;
third and fourth optical fibers each having a first end connected to the circulator;
a collimator connected to a second end of the third optical fiber;
a coupler that couples and outputs beams of light propagated separately through each of the second and fourth optical fibers; and
a detector that detects light outputted from the coupler.

8. The measurement apparatus according to claim 7, further comprising a scanner that sweeps light emitted from the collimator.

9. The measurement apparatus according to claim 7, further comprising a signal processing circuit that measures a distance to a physical object based on a result of detection by the detector.

10. The measurement apparatus according to claim 7, further comprising a signal processing circuit that measures a spectrum of a physical object based on a result of detection by the detector.

* * * * *